United States Patent [19]

Ookawa et al.

[11] Patent Number: 4,644,491
[45] Date of Patent: Feb. 17, 1987

[54] SIGN GENERATION SYSTEM FOR A CARRY SAVE ADDER

[75] Inventors: Tomoyuki Ookawa, Kokubunji; Hiroshi Murayama, Hadano, both of Japan

[73] Assignees: Hitachi, Ltd.; Hitachi Microcomputer Engineering Ltd., both of Tokyo, Japan

[21] Appl. No.: 653,053

[22] Filed: Sep. 21, 1984

[30] Foreign Application Priority Data

Sep. 22, 1983 [JP] Japan .................................. 58-175994

[51] Int. Cl.[4] .......................... G05F 7/50; G06F 7/52; G06F 7/38
[52] U.S. Cl. .................................. 364/784; 364/754; 364/715
[58] Field of Search ....................... 364/754, 757–760, 364/784, 786–788

[56] References Cited

U.S. PATENT DOCUMENTS 3,976,866 8/1976 Motegi et al. ...................... 364/786
4,538,238 8/1985 Circello et al. .................... 364/746
4,575,812 3/1986 Kloker et al. ...................... 364/760

Primary Examiner—James D. Thomas
Assistant Examiner—Dale M. Shaw
Attorney, Agent, or Firm—Antonelli, Terry & Wands

[57] ABSTRACT

A sign generation system having a plurality of carry save adders. When adding a sum and a carry generated by a carry save adder in a next stage carry save adder, a full sum of two-bit sign fields adjacent to data fields of the sum and the carry is calculated.

The resulting two-bit sign is combined with a constant to generate an exact sign, decreasing number of transferred sign bits.

5 Claims, 10 Drawing Figures

SIGN GENERATION SYSTEM FOR A CARRY SAVE ADDER

BACKGROUND OF THE INVENTION

1. Field of the Invention

The present invention relates to a sign generation system for a carry save adder, and more particularly to a sign generation system suitable to a multiple generation type multiplier which uses a carry save adder.

2. Description of the Prior Art

In a conventional multiple generation type multiplier, a carry save adder is used to sum multiples. The carry save adder can attain a high speed addition with a fewer stages than a carry propagate adder does, but since an output is divided into a sum and a carry, the number of bits of the sum and the carry is larger than the number of bits of a product predicted by the numbers of bits of a multiplier and a multiplicand. For the multiplication of data represented by two's complement, the number of bits of the product is represented by $n \leq 1 + m - 1$ where l, m and n are the numbers of bits of the multiplicand, the multiplier and the product with one bit being assigned to a sign bit. The sign of equality is met when both the multiplicand and the multiplier are negative numbers and absolute values thereof are maximum.

As an example, let us consider a multiplication of $1 \times 3 = 3$. In this case, the number of bits of the product is predicted to be no larger than four because the number of bits of the multiplicand is two, the number of bit of the multiplier is three and the number of bit of the sign is one. FIG. 1 shows an actual operation process of the above multiplication which is carried out by a CSA tree group comprising two stages of carry save adders (CSA's) 103 and 104. The data inputted to the CSA 103 has six bits including extended sign bits. The multiples "000100" and "111111" representing $2^2 - 2^0 = 4 - 1$ are generated by a Booth multiple generation method. Through two sums of the CSA addition by the CSA tree group 102, a sum of $-13$ and a carry of $+16$ are generated. Therefore the data field requires five bits. Accordingly, the sum and the carry both require six bits, respectively, to represent the results, with one bit being used for the sign.

The final result ($+3$) of the above multiplication is obtained by inputting the sum and the carry to a carry propagate adder (CPA) 105 as shown in FIG. 1.

If, however, a succeeding operation should be carried out, i.e., if the sum and the carry are to be summed in the next stage carry save adder, the data field having a larger number of bits for a sum and a carry than the number predicted by the numbers of bits of the multiplicand and the multiplier used to calculate the sum and the carry is propagated as it is, but the sign field must be expanded. Many circuits are required to expand the sign field and a circuit delay is included by those circuits.

SUMMARY OF THE INVENTION

It is an object of the present invention to provide a sign generation system for a carry save adder which can reduce the number of bits of a sign field to be added in the carry save adder.

In the carry save adder, a sign is determined by a full sum of a sum and a carry, and the number of bit of a carry carried over from a data field is one bit at most. In the present invention, a full sum of two-bit sign fields adjacent to data fields of the sum and the carry are previously calculated and the two-bit sign is combined with a constant to generate a correct sign.

DESCRIPTION OF THE PREFERRED EMBODIMENTS

Figures 1, 2A, 2B, 2C, 3:
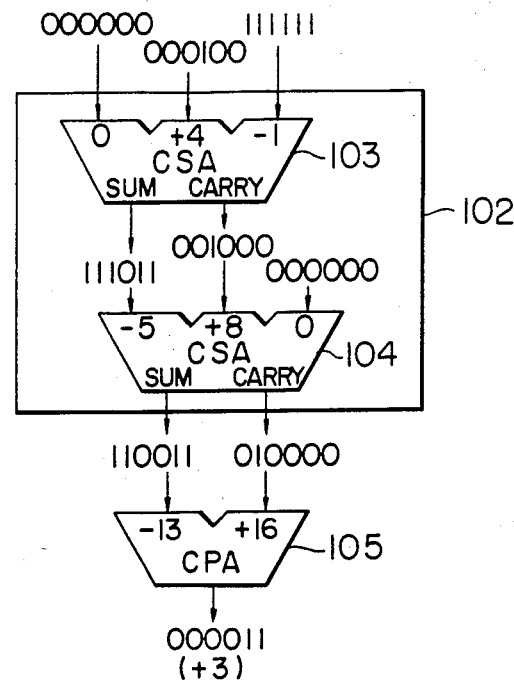
FIG. 1 illustrates an example of an operation by a carry save adder.
FIGS. 2a to 2c illustrate a principle of a sign generation system in the present invention.
FIG. 3 shows a relation between a sign field of a full adder and a modified carry sign field.

FIGS. 2a to 2c illustrate a principle of the present invention. A sign field SA having four bits and a data field DA having three bits of a sum are represented by $SA = sa3, sa2, sa1, sa0$
$DA = da1, da2, da3$ and a sign field SB and a data field DB of a carry are represented by $SB = sb3, sb2, sb1, sb0$
$DB = db1, db2, db3$ where the variables of sa3, da1, sb3 etc. represent a bit, respectively. Boundaries of the sign fields and the data fields in the sum and the carry are determined by the lengths of the data to be operated. In a full adder mode, they have a relationship as shown in FIG. 2a, where S is a sign field in the full adder. Each bit in the sign field out of a full adder must have same value as any other. D is a data field. Accordingly, we can express S and D as follows:

$S = s, s, s, s$ and $D = d1, d2, d3$,

As shown in FIG. 2b, a pair of mutually cancelling data $-SA$ and $+SA$ are added to the sum data and the carry data, respectively, to modify those data. As a result, the sign field of the sum is changed to an all-zero constant as shown in FIG. 2c. Accordingly, the sign of the sum need not be transferred and only the sign SC ($=SA+SB$) of the carry need be transferred.

The correspondence between the modified carry sign SC and the full adder mode sign S is considered. Since the carry (Car) carried over to the sign field by the addition of the data fields DA and DB is one bit at most, the following equation is met.

$$S = SC + Car \qquad (1)$$

The value of Car is naturally either one or zero. A range of SC is determined from S and Car to be one of four shown in FIG. 3. The left most three bits of SC have a same value of either "111" or "000", and $SC3 = SC2 = SC1$.

From FIG. 3 and the relation of $SC = SA + SB$, SC is given by $$SC = sc1, sc1, sc1, sc0 \qquad (2)$$

where
$sc0 = sa0 \oplus sb0$ sc1=sa1⊕sb1⊕(sa0·sb0), and ⊕ denotes an operation of the exclusive OR. Accordingly, SC can be transferred by the two bits, sc1 and sc0.

Figure 4:
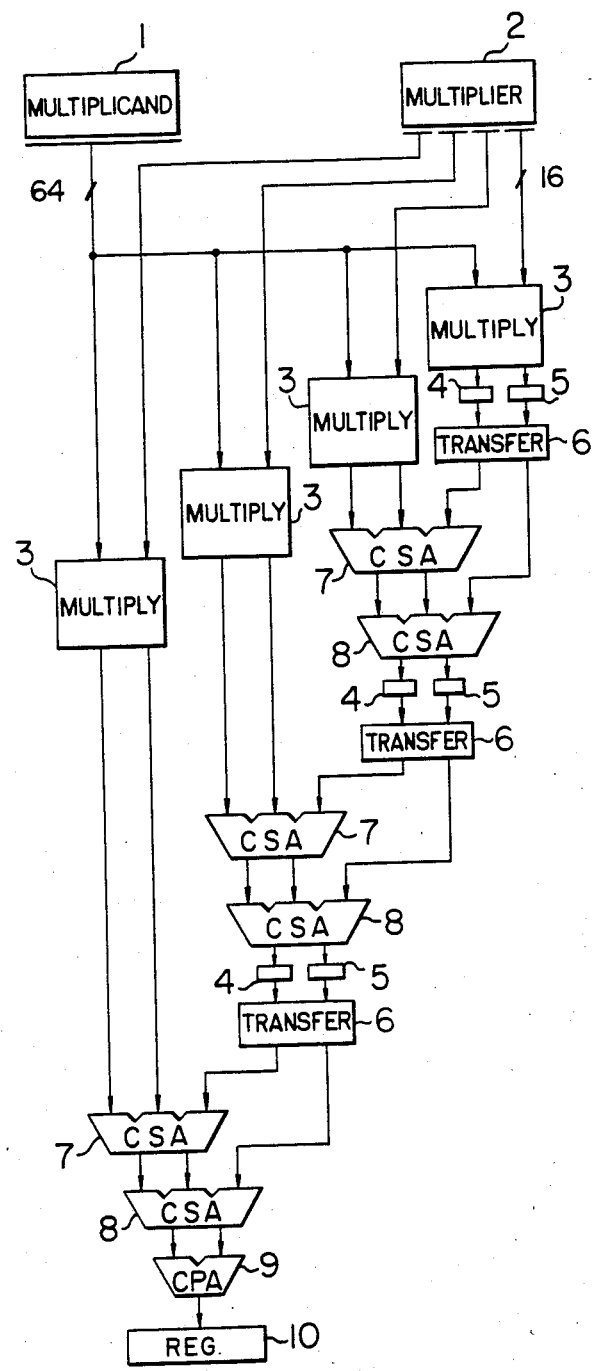
FIG. 4 is a block diagram of a multiplier in accordance with one embodiment of the present invention.

FIG. 4 is a block diagram of a multiplier in accordance with one embodiment of the present invention. Numeral 1 denotes a register in which a 64-bit multiplicand is loaded, numeral 2 denotes a register in which a 64-bit multiplier is loaded, numeral 3 denotes a multiplier circuit for multiplying the 64 bits of the multiplicand and one digit (16 bits) of the multiplier, numeral 4 denotes a register in which a sum in the digit is loaded, numeral 5 denotes a register in which a carry in the digit is loaded, numeral 6 denotes a transfer circuit for transferring the sum and the carry in the digit to the next digit, numerals 7 and 8 denote carry save adders which sum the outputs from the transfer circuit 6 to the outputs from the next digit multiplier circuit 3, numeral 9 denotes a carry propagate adder and numeral 10 denotes a register in which a final product is loaded.

Figure 5:
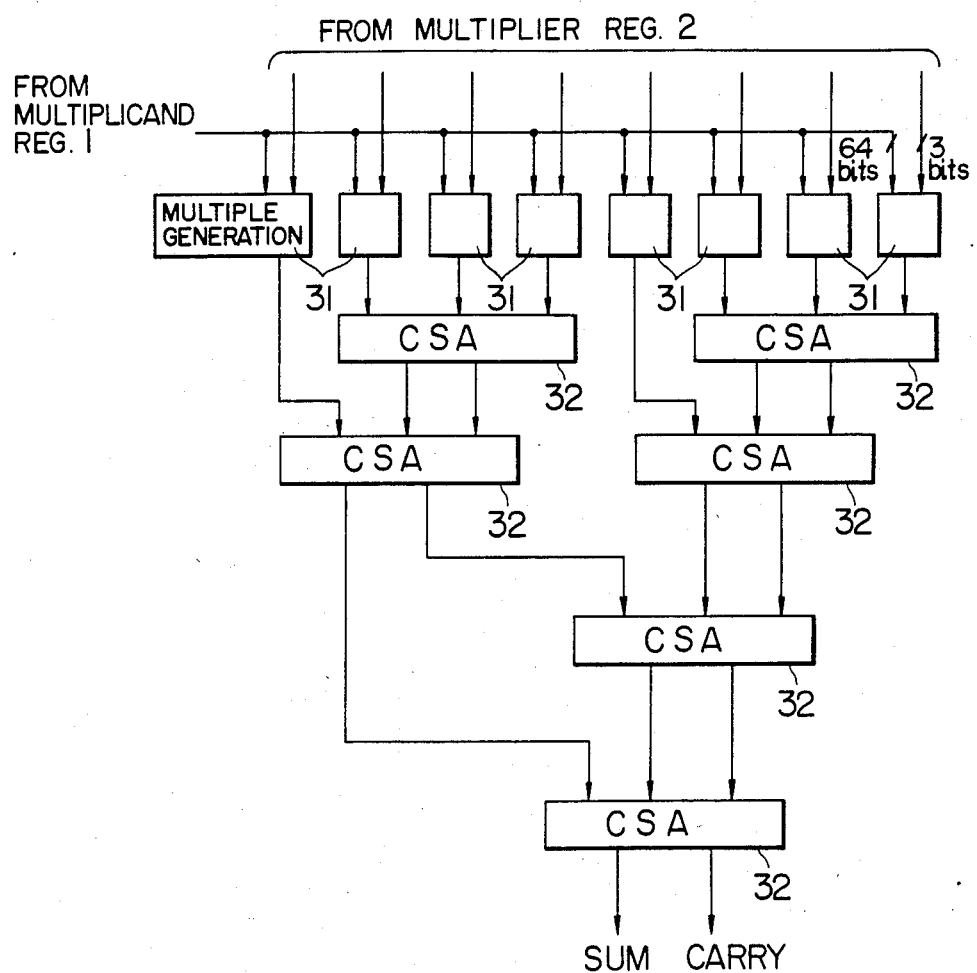
FIG. 5 shows a detail of a multiplication circuit of FIG. 4.
Figure 6:
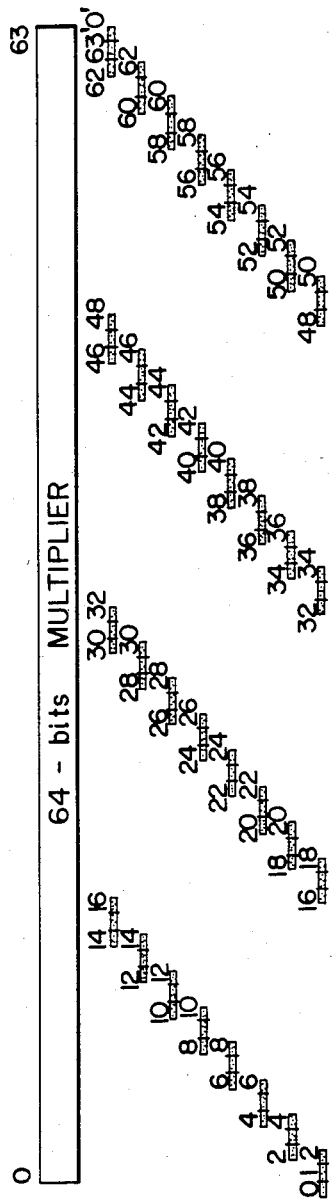
FIG. 6 illustrates a method for dividing a multiplier.

FIG. 5 shows a detail of the multiplier circuit 3 of FIG. 4. The 64-bit multiplier is divided into 32 3-bit groups as shown in FIG. 6, eight of which are applied to each of the multiplier circuits 3. Numeral 31 denotes a multiple-generation circuit which receives one of the 3-bit groups and the 64-bit multiplicand to generate a multiple of the multiplicand. Numeral 32 denotes a carry save adder which combines the outputs of the multiple generation circuits 31 to generate a sum and a carry for one digit of the multiplier.

FIG. 6 illustrates a method for dividing the 64-bit multiplier into the 32 groups. Each group consists of three bits, with one bit of each group being duplicated with one bit of the adjacent group. A constant "0" is supplied to the last group.

The present invention is applied when the sum and the carry from the carry save adder are to be summed in the next digit carry save adder. In FIG. 4, the present invention is applied to the transfer circuit 6.

Figure 7:
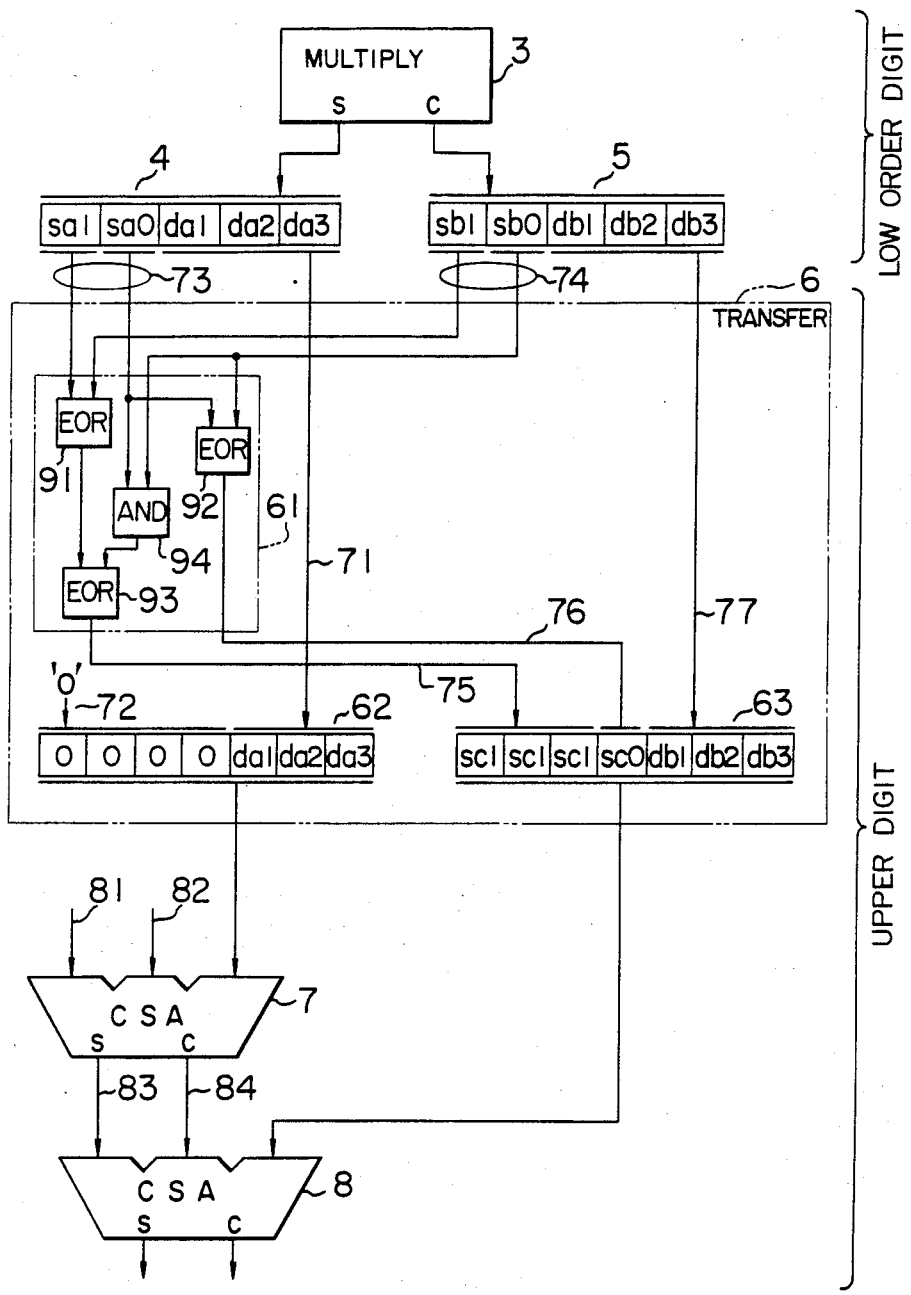
FIG. 7 shows a transfer circuit and a peripheral circuit of FIG. 4.

FIG. 7 shows a detail of the transfer circuit 6 and a peripheral circuit. The transfer circuit 6 includes a full adder 61 and registers 62 and 63.

Of the sum in the register 4 and the carry in the register 5 generated by the multiplier circuit 3, the data field (da1, da2, da3) 71 of the sum is shifted and transferred to the upper digit, a positive sign field (all-zero) 72 is combined thereto and it is loaded in a register 62. The content of the register 62 is summed with a sum 81 and a carry 82 of the upper digit in the CSA 7 so that the CSA 7 generates a sum 83 and a carry 84. A two-bit sign field 73 (sa1, sa0) adjacent to the data field 71 of the low order digit and a sign field 74 (sb1, sb0) of a carry of the low order digit are summed by a two-bit full adder 61 comprising exclusive OR circuit 91, 92 and 93 and an AND circuit 94, which generates two-bit signs 75 and 76 (sc1, sc0). The signs 75 and 76 are shifted and transferred to the high order digit together with a data field 77 (db1, db2, db3) of the carry calculated in the low order digit, and the sign 75 (sc1) is expanded to "sc1, sc1, sc1" which is loaded in a register 63. The content of the register 63, and the sum 83 and the carry 84 calculated by the CSA 7 are supplied to the CSA 8 which generates new sum and carry.

In another modified embodiment not shown, the signs 75 and 76 may be transferred to the most left four bits of the register 62, respectively and, at the same time, the positive sign field 72 may be transferred to the left most four bits of the register 63.

Figure 8:
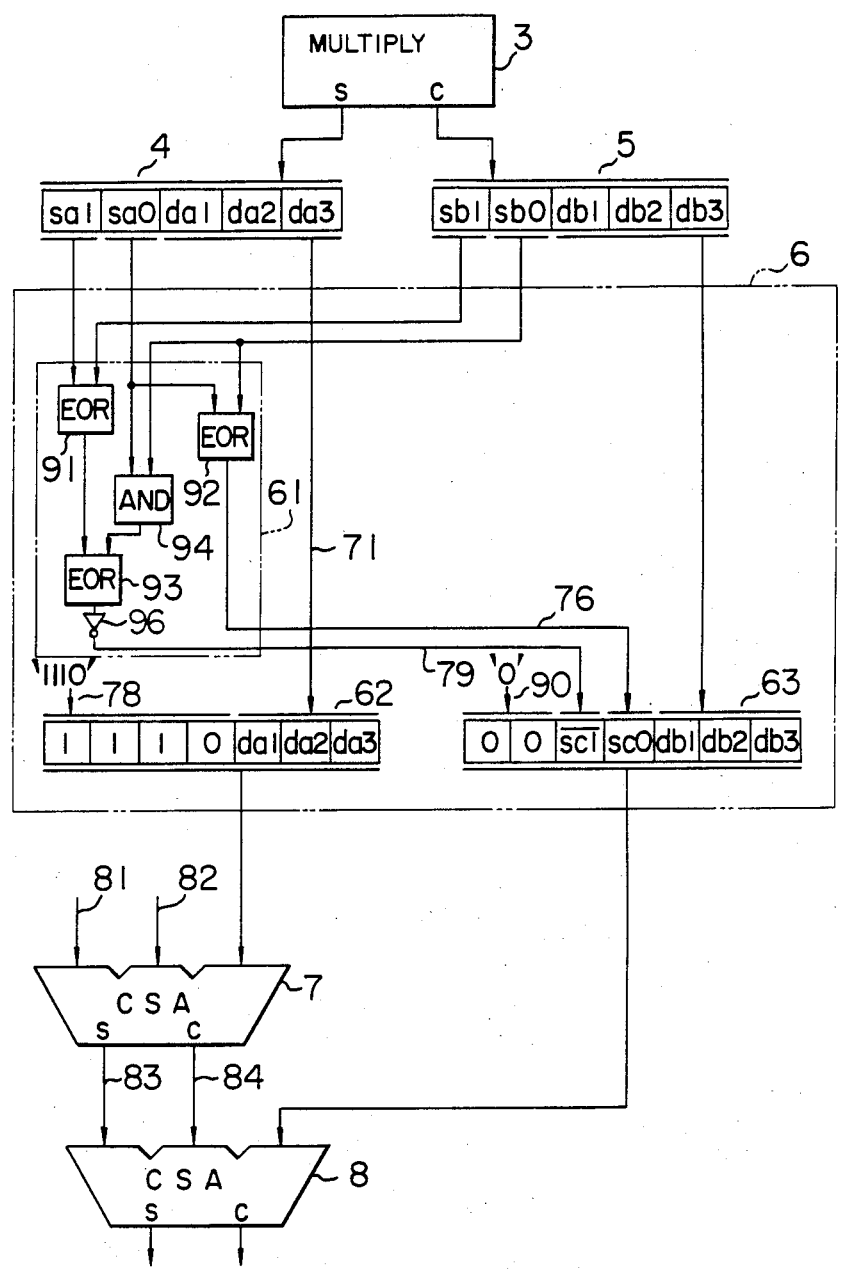
FIG. 8 shows a modification of FIG. 7.

FIG. 8 shows another modification of the transfer circuit. The like elements to those shown in FIG. 7 are designated by the like numerals. A constructional difference from FIG. 7 resides in that a constant "1110" 78 is used as the sign field of the sum, and a sign sc1 79 which is obtained by an inverter 96 connected to the EOR 93, a sign sc0 76 and constants "0" 90, that is, "0, 0, sc1, sc0" is used as the sign field of the carry. The reason why this transformation is valid is that "111" added to sc1 makes "sc1, sc1, sc1". Thus, the expansion of the sign sc1 to "sc1, sc1, sc1" as is done in FIG. 7 is not necessary and hence the variation of the increased fan-out of the EOR 93 need not be taken into consideration and a faster operation is attained.

The multiplier has been described above. It should be understood that the present invention is not limited to the multiplier but it can be applied to any circuit which uses the CSA. While the four-bit sign field and the three-bit data field were explained above, the present invention is effective to those fields having other number of bits.

As described hereinabove, in accordance with the present invention, when the sum and the carry generated by the carry save adder are to be added in the next digit carry save adder, the sign is generated by the two-bit sets adjacent to the data fields of the sum and the carry. Accordingly, the length of the sign field to be calculated is reduced and the circuit has more generalities because no correction term which depends on the tree structure of the carry save adder is included.

What is claimed is:

1. A sign generation method for a carry save adder in a circuit for adding a sum and a carry generated by one carry save adder in a next stage carry save adder, comprising steps of
    calculating a full sum of two-bit sign fields adjacent to data fields of the sum and the carry, respectively, and
    combining the resulting two-bit sign with a constant to generate an exact sign.

2. A sign generation method for a carry save adder according to claim 1 wherein the sign field of one of the sum and the carry is an "all-zero" constant, and the sign field of the other uses one of two bits of said resulting two-bit sign as one bit and an expanded bit as the other bit.

3. A sign generation method for a carry save adder according to claim 1 wherein the sign field of one of the sum and the carry uses a constant "1110" and the sign field of the other uses a combination of a two-bit sign derived by inverting one of the two bits of said resulting two-bit sign and a constant "00".

4. A sign generation system in a calculation apparatus including a plurality of carry save adders successively combined to transfer intermediate carry and sum to next carry save adders comprising:
    means for calculating a sum of lowest two-bit sign of said carry and said sum,
    means for providing a constant as a sign field of either one of said intermediate carry or sum, and
    means for providing said lowest two-bit sign modified with constants to said next carry save adders as a sign field of the other of said intermediate carry or sum.

5. A sign generation system according to claim 4 wherein said next carry save adders are two carry save adders connected in series to carry out one digit calculation and said outputs of two providing means are inputted to said two carry save adders, respectively.

* * * * *